Sept. 27, 1955   J. BJORKSTEN   2,718,684

PIPELAYING METHOD AND MACHINE

Filed March 5, 1951

INVENTOR.
JOHAN BJORKSTEN
BY
Attorney

United States Patent Office 2,718,684
Patented Sept. 27, 1955

2,718,684

PIPELAYING METHOD AND MACHINE

Johan Bjorksten, Madison, Wis.

Application March 5, 1951, Serial No. 213,993

4 Claims. (Cl. 25—32)

This invention relates to the art of laying of pipe, particularly pipe of relatively large diameters for transportation of liquids in quantity, such as for example water, petroleum oils, gasoline, fuel oils, milk and any other liquid commodity handled in quantity.

Heretofore, it has been the practice to lay such pipe in short lengths. Usually these pieces have been of ferrous metal and only a few feet long, and have been welded together as the pipe was laid. Furthermore, the pipe then had to be brushed clean, wound with a protective covering of impregnated paper, additionally impregnated with asphalt, and finally tested for completeness of the coating coverage and precision of the weld, before being placed permanently in the ground. All of this has resulted in making the laying of such pipe a very slow and tedious operation; particularly the fact that the pipe is welded together so as to have seams every few feet provides numerous opportunities for leakage or damage to the pipe or for metallurgical conditions conducive to corrosion.

The present invention contemplates a radical departure from precedent in the art of laying pipelines, in that the pipe is made as it is laid, in that the pipe is continuous, without any seams, in that the pipe is made of a plastic material having much lighter specific gravity than metal, in that it is not necessary to transport pipe sections containing air because the material is transported in bulk and the pipe is formed as it is laid, and finally, in that the operations of testing seams, winding corrosion proofing, coating, and checking of the pipe are eliminated.

An object of my invention is therefore an improved method of laying pipe.

Another object is a method for laying pipe continuously.

Another object is a device for continuous production of pipe as it is being laid.

Another object is a pipeline containing substantially no seams or heterogeneous protective covering.

Further objects will become apparent as the following detailed description proceeds.

In accordance with my invention, a screw-type or other extruder mounted on continuous treads, spaced to straddle a trench, travels along said trench continuously extruding synthetic resin pipe into the trench and thus continuously laying pipe as it emerges from the extruder, the rate of forward travel being substantially equal to the rate of extrusion of the pipe.

Figure 1:
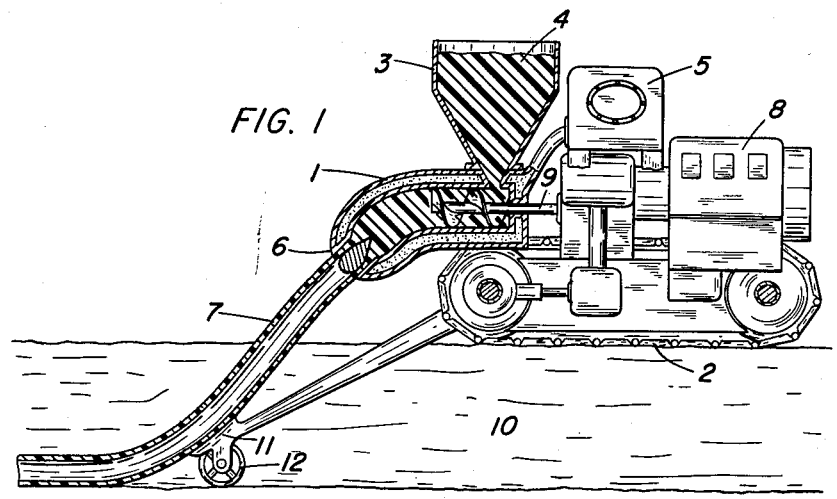
Figure 2:
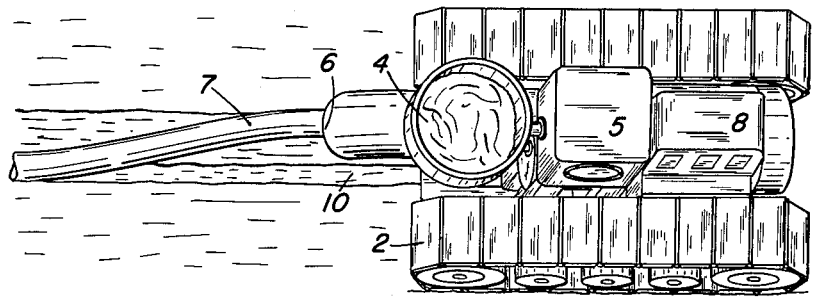

One embodiment of this invention is shown in the accompanying drawings, of which Figure 1 is a partially cross-sectional elevation in perspective and Figure 2 is a perspective view from above.

In the figures, extruder 1 is mounted on caterpillar tracks 2 and is provided with hopper 3 which is filled with thermoplastic synthetic resin 4. The device is provided with steam generator 5, for heating the die 6 and other parts of extruder 1. The same object may be accomplished, in other embodiments, by any suitable heating method such as, for example, a heat transfer liquid or an electric heating system. Pipe 7 of thermoplastic synthetic resin is continually extruded from die 6, as the device moves along the trench, driven by engine 8, which also drives screw 9 of extruder 1, or alternatively, in another embodiment, pulled by a tractor (not shown). Pipe 7 is guided into position in trench 10 by guide trailer 11, which is partly supported by wheel 12 running on the bottom of trench 10, and is pulled by the extruding device, to which it is attached. In other embodiments guide 11 may be segmented, may have a series of shaped rollers contacting the pipe, may travel on more than one wheel or on skids or sled runners, may be entirely absent, or may consist of shaped rollers suspended from a beam overhanging the trench behind the extruder and attached to and supported by the extruding device. The digging of trench 10 may be accomplished entirely apart from the pipelaying operation or in another embodiment, not shown, it may be done by a plow member or trench-digger mounted on the extruder device.

The pipe may consist of any thermoplastic or thermoplastically extrudable synthetic resin, such as, for example, polyethylene, polystyrene, copolymers of styrene and butadiene, copolymers of styrene and other monomers, sulfone-olefin resins, polyvinylidene chloride, copolymers of vinylidene chloride and vinyl chloride, copolymers of vinyl chloride and vinyl acetate, nylon resins, and the like. Polyethylene is preferred. The pipe may be stretched or drawn as it leaves the extruder either by moving the machine faster than the extrusion speed, or by extruding on a moving belt or rollers (not shown).

The resin for fabricating the pipe is brought to the extruder by truck, railroad car or other suitable means and hopper 3 is periodically filled, to provide a continuous supply of material for the extruder. Thus the pipe is produced and laid in the ground in one continuous length, interrupted only where it is necessary that a branch line T, valve, pump, or booster pump be installed. Such fittings and connections may be made by flanges and clamping devices or other means well known to the art.

The order of magnitude envisaged in this invention is illustrated by some of the requirements to be met in laying a 32 inch outer diameter pipe having walls one inch thick. Assuming polyethylene or a closely related polymer to be the thermoplastic synthetic resin used, one mile of pipe would weigh 203,000 pounds. To heat this amount of this material to the extrusion temperature, approximately 36.5 million B. t. u.'s are required. To furnish this amount of heat approximately 14,320 horsepower hours are needed and to produce this amount of horsepower hours, two tons of fuel per mile of pipe are required, operating with equipment having 50% efficiency in the combustion and heat transfer processes.

The invention relates to laying pipe over long distances and is scarcely useful for a pipe having a length of less than 200 yards and would preferably be used for pipe having a length of at least one mile. The invention provides pipe of these lengths and of far greater lengths, entirely devoid of any seam, joint or connection whatsoever.

It is fully realized that this invention is capable of modifications and variations, and it is intended to include in this invention such modifications, so that the invention is to be limited only by the claims in which it is my intention to cover all novelty inherent therein as broadly as possible, in view of prior art.

Having thus disclosed my invention, I claim:

1. A machine for laying synthetic resin pipe, comprising in combination: an extruder, said extruder comprising a pipe-forming die and a helical screw adapted to forcing synthetic resin through said die; a hopper adapted to contain synthetic resin particles opening into said extruder; rotating means supporting said machine; heating means surrounding at least a portion of said extruder containing said helical screw and adapted to soften synthetic resin in said extruder; an engine driving said screw; and a guide partially supported by the ground, adapted to guide pipe extruded by said extruder into a trench in the ground, characterized by said guide extending over no more than a portion of the distance between said extruder die and said ground in such manner as to provide a length of pipe devoid of supporting means on each side thereof, respectively between said die and said guide and between said guide and said ground.

2. The process of laying pipe which comprises extruding a pipe consisting of a thermoplastic synthetic resin with a moveable extruder traveling forward along a trench at the same rate said pipe is extruded, and then causing said pipe to travel through a space devoid of supporting means, thence into supported relationship with a supporting guide, thence through a space devoid of supporting means and thence into supported relationship with a surface of the earth.

3. A pipelaying device comprising in combination means for continuously extruding pipe from thermoplastic polymer; means for moving the said extruding means forward substantially at the rate of pipe laying; and means for guiding the extruded pipe into its final position, characterized by said guiding means providing discontinuous support for said pipe between said extruding means and the final position of said pipe, being adapted to provide a portion of the pipe devoid of supporting means between said extruding means and said guiding means and to provide a portion of said pipe devoid of supporting means between said guide and said final position of said pipe.

4. A machine for laying pipe comprising in combination an extruder comprising a helical screw adapted to extrude synthetic resin, said extruder being disposed above the level of the ground, a hopper feeding thereinto adapted to contain synthetic resin, an engine driving said extruder, heating means surrounding at least the portion of said extruder containing said helical screw for softening synthetic resin in said extruder, rotating means supporting said machine, and a guide adapted to guide pipe extruded by said extruder through the ambient atmosphere into contact with the ground, said machine being characterized by said guide extended for only a portion of the distance between said extruder and the ground in such manner as to provide a portion of said pipe devoid of supporting means between said extruder and said guide and a portion of said pipe devoid of supporting means between said guide and the ground.

References Cited in the file of this patent

UNITED STATES PATENTS

| | | |
|---|---|---|
| 108,550 | Zinsser | Oct. 18, 1870 |
| 952,488 | Wiggins | Mar. 22, 1910 |
| 1,084,158 | Marsh | Jan. 13, 1914 |
| 1,309,878 | Carr | July 15, 1919 |
| 1,368,918 | Fortney | Feb. 15, 1921 |
| 1,995,791 | Bonnet | Mar. 26, 1935 |
| 2,052,005 | Root | Aug. 25, 1936 |
| 2,183,602 | Wiley | Dec. 19, 1939 |
| 2,406,025 | Moor | Aug. 20, 1946 |
| 2,519,375 | Jargstorff et al. | Aug. 22, 1950 |
| 2,520,199 | Butcher | Aug. 29, 1950 |